March 24, 1959

J. M. CALEHUFF ET AL 2,878,620

TRANSFER TUBE MECHANISM

Filed Jan. 29, 1958

INVENTORS
JAMES M. CALEHUFF
WILLIAM L. REITER
BY
Morton Amster
ATTORNEY

March 24, 1959  J. M. CALEHUFF ET AL  2,878,620
TRANSFER TUBE MECHANISM
Filed Jan. 29, 1958  4 Sheets-Sheet 3

INVENTORS
JAMES M. CALEHUFF
WILLIAM L. REITER
BY Morton Amster
ATTORNEY

March 24, 1959 J. M. CALEHUFF ET AL 2,878,620
TRANSFER TUBE MECHANISM
Filed Jan. 29, 1958 4 Sheets-Sheet 4

INVENTORS
JAMES M. CALEHUFF
WILLIAM L. REITER
BY Morton Amster
ATTORNEY

United States Patent Office 2,878,620
Patented Mar. 24, 1959

2,878,620

TRANSFER TUBE MECHANISM

James M. Calehuff, Montoursville, and William L. Reiter, Williamsport, Pa., assignors to Sylvania Electric Products Inc., a corporation of Massachusetts Application January 29, 1958, Serial No. 711,951

13 Claims. (Cl. 49—1)

The present invention relates in general to a machine for cutting glass tube into lengths and for glazing the cut ends of the lengths, and in particular to an improved transfer mechanism for use with such tube-cutting and glazing machines.

A typical tube-cutting and glazing machine usually includes a tube-cutting turret which is arranged to advance relatively long lengths of glass tubing into position for cut off and transfer, a tube-glazing turret arranged to receive and support the cut length of tube on rotatable spindles for glazing in the known manner, and a transfer turret interposed between the tube-cutting turret and the tube-glazing turret for picking up successive lengths of tube as cut from the tube-cutting turret and for transferring the same into supported relation on the spindles of the tube-glazing turret. Thereupon, the cut lengths, supported on the respective glazing spindles, are rotated at a relatively high speed while being exposed to glazing burners to achieve centrifugal glazing at both ends of the cut lengths.

The transfer turret employed in this type of machine usually includes a turret body arranged to be indexed stepwise to advance successive cut lengths of tubing from the cutting turret to the glazing turret. The cut lengths of tubing are received in open-ended, upstanding tubular guides or sleeves fixed on the upper side of the turret body into which the cut lengths are loaded when positioned beneath the cutting turret and from which the cut lengths are unloaded when positioned beneath the glazing turret. The lower open ends of the tubular guides or sleeve are closed by a stationary support which extend from a loading or transfer location beneath the cutting turret to an unloading or transfer location beneath the glazing turret. The stationary support, usually in the form of a hardened wear plate serves as a footing for the cut lengths of glass which are engaged within the tubular guide and moved along the support under control of the transfer turret. In use, this type of transfer turret exhibits a number of shortcomings. As the successive lengths of glass tube are cut and positioned in the tubular guides on the transfer turret, the bottom edges of the cut lengths rest on the stationary support. Accordingly, as the transfer turret indexes, there is a sliding or abrading contact between such bottom edges and the stationary support which often causes the cut lengths to be chipped, cracked, or otherwise rendered useless, representing a source of shrinkage. Further, as the glass-cutting and glazing machine is operated, there is a tendency for broken or crushed glass fragments and particles to accumulate on the stationary support at the transfer location relative to the cutting turret. Frequently, the glass accumulation causes the cut lengths to be raised above the prescribed level established by the plane of the stationary support which in turn results in the improper orientation of the cut lengths on the respective glazing spindles. Improper positioning of the cut lengths of tube on the glazing spindle results in improper exposure of the cut lengths to the glazing burners and is a further cause of shrinkage. Still further, the accumulation of glass particles and fragments between the transfer turret and the stationary support requires periodic machine shut down and manual clearing of such accumulation to assure the correct positioning of the cut lengths of tube for unloading from the transfer turret onto the respective glazing spindles. Necessarily, the need for periodically stopping and manually cleaning the machine, represents a still further cause of increased cost in the processing of the glass tubes.

It is broadly an object of the present invention to provide an improved tube-cutting and glazing machine obviating one or more of the aforesaid difficulties. Specifically, it is within the contemplation of the present invention to provide an improved transfer mechanism for use in a tube-cutting and glazing machine which enables the accurate transfer of successive cut lengths of tube to the glazing turret or unit with accuracy and reliability over prolonged periods of use and with substantially no chipping or cracking of said cut lengths.

In accordance with an illustrative embodiment demonstrating features and advantages of the present invention, the tube-cutting and glazing machine, which includes a tube-cutting unit having an intermittently indexed cutting turret and tube-cutting and feeding mechanisms for feeding a prescribed length of tubing in position for cut off transfer and a tube-glazing unit having an intermittently indexed glazing turret and rotatable glazing spindles on the glazing turret arranged to internally engage and support the cut lengths of tube, is provided with a transfer unit which is interposed between the tube-cutting and tube-glazing units. The transfer unit is arranged to receive successive lengths of tube or tubing after cut off by the tube-feeding and cutting mechanisms and to deliver the cut lengths into supporting relation on the rotatable glazing spindles of the glazing turret, whereupon the cut lengths of tubes are revolved at a relatively high speed to attain centrifugal glazing at both ends of the cut lengths. The transfer unit includes an intermittently indexed transfer turret and tube-receiving members, usually in the form of open ended tubular guides or sleeves. Closures are arranged to at least partially block the open lower ends of the tube-receiving members and to provide individual footings for the respective cut lengths of tubings during transfer from the cutting turret to the glazing turret. Suitable means are coordinated to the indexing of the turrets by the turret drive for moving the respective closures out of blocking relation to the tube-receiving members to enable the tube-receiving members to be cleared, preferably by the action of gravity, of glass fragments and particles. The timing of the movement of the closures out of blocking relation to the respective tube-receiving members is preferably such that during each transfer cycle (i.e. during the movement of each tube-receiving member from its unloading position relative to the glazing turret into its loading position relative to the cutting turret) successive tube-receiving members are open at their lower ends to clear the same of any particles which have accumulated therein during the operative portion of the transfer cycle.

Advantageously the closures for the respective tube-receiving members are carried on the intermittently indexed transfer turret such that there is no rubbing contact between a stationary surface and the cut lengths incident to the transfer operation which has the tendency to chip or crack the cut lengths. Further, the provision for periodic purging of the respective tube-receiving members precludes the accumulation of broken and crushed glass particles on the transfer turret and virtually eliminates the possibility of improper orientation of the cut lengths when delivered to the rotatable spindles of the glazing turret.

The above brief description, as well as further objects, features and advantages of the present invention will be more fully appreciated by reference to the following detailed description of an illustrative embodiment demonstrating features of the present invention, when taken in conjunction with the accompanying drawings, wherein.

Figures 1, 2:
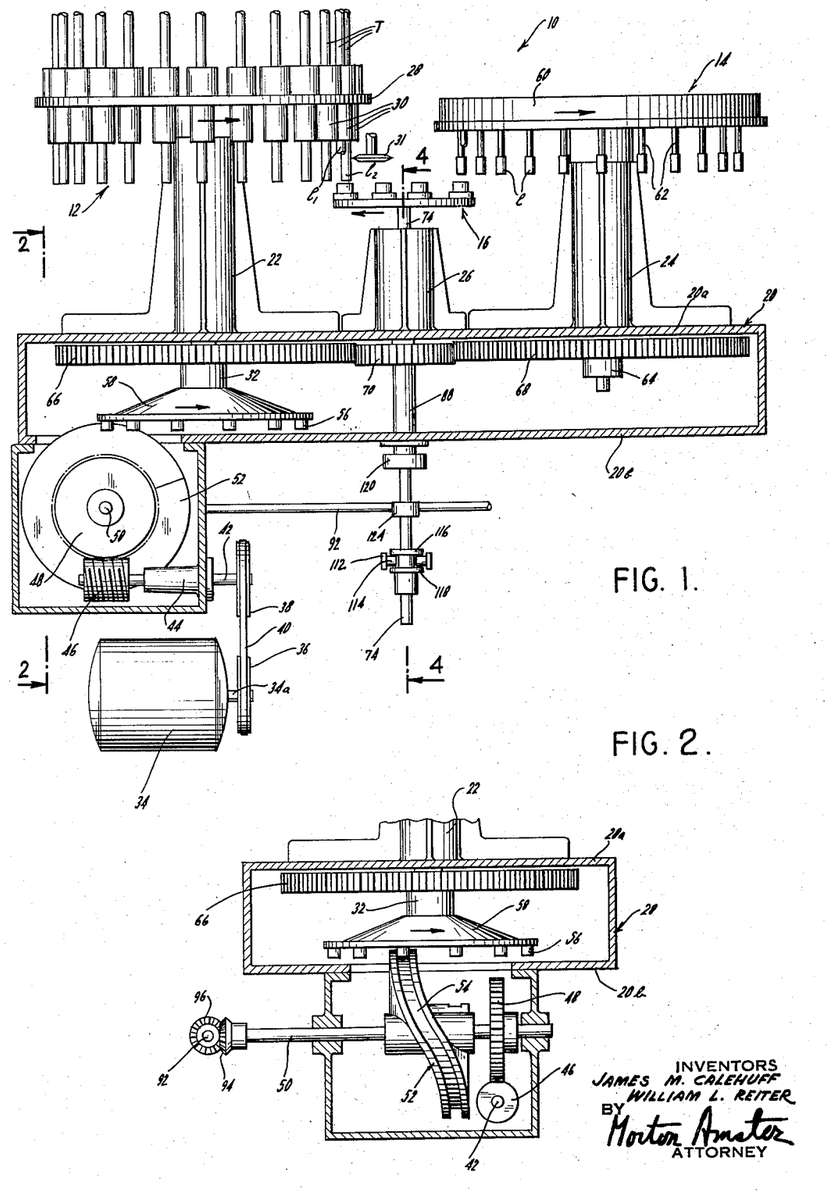
Fig. 1 is an elevational view, with parts sectioned and other parts omitted in the interest of simplicity and clarity, showing a tube-cutting and glazing machine incorporating an improved transfer unit in accordance with the present invention.
Fig. 2 is a fragmentary sectional view taken substantially along the line 2—2 of Fig. 1 and looking in the direction of the arrows, showing the indexing drive for the cutting turret of the illustrative tube-cutting and glazing machine.

Referring now specifically to the drawings, there is shown in Fig. 1 in somewhat diagrammatic fashion a typical tube-cutting and glazing machine, generally designated by the reference numeral 10, which includes a tube-cutting turret 12 arranged to feed a number of lengths of glass tubing T into position for cut off and transfer, a tube-glazing turret 14 arranged to receive successive cut lengths $l$ of glass tubing and to rotate the same at relatively high speed for centrifugal glazing at the opposite ends of the cut lengths $l$, and a transfer turret 16 interposed between the cutting and glazing turrets 12, 14 and effective to tranfer successive cut lengths from the cutting turret 12 to the glazing turret 14. Since the details of the cutting and glazing turrets 12, 14 are generally known, only those portions of the machine 10 will be described which are necessary for a complete understanding of the improved structure of the transfer turret 16 and its coordination into the overall machine operation.

Figure 3:
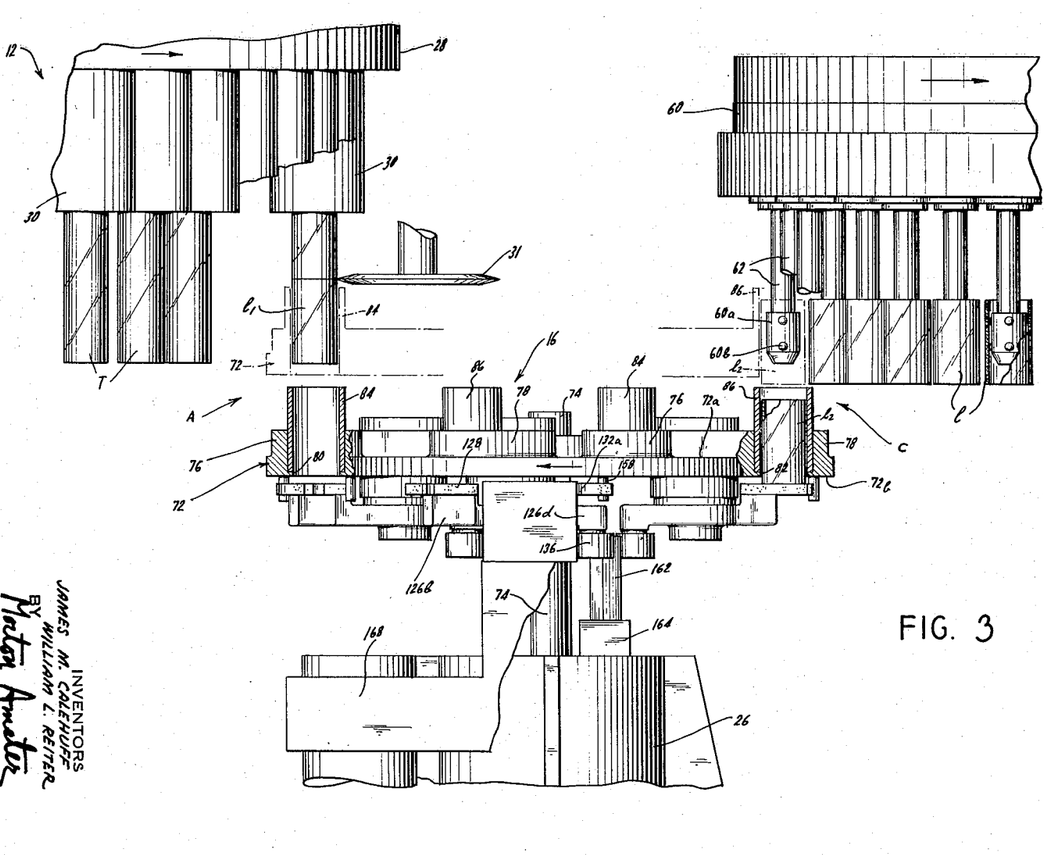
Fig. 3 is a fragmentary elevational view, taken on an enlarged scale and with parts broken away and sectioned, showing the details of the transfer turret and its disposition relative to the tube-cutting and tube-glazing turrets of the machine.

Reference will now be made to Figs. 1 to 3 of the drawings for a general description of the turret structures and of the indexing drive mechanisms by which the turrets 12, 14, 16 of the tube-cutting and glazing machine 10 are coordinated and actuated in timed relation to each other. The tube-cutting and glazing machine 10 includes a main frame or housing 20 which carries on its upper wall 20a upright standards or castings 22, 24, 26 which serve to journal the respective turrets for rotation about spaced vertical axes. Specifically, the cutting turret 12, which is generally of known construction, includes a turret body 28 which carries a number of tube-chucking heads 30 which are arranged to feed prescribed lengths $l$ of the tubing T into position for cut off by rotary knives 31 and for transfer by the intermediate transfer turret 16. The body 28 of the cutting turret 12 is fixed to the upstanding turret shaft 32 which is journaled within the upright standard 22 for stepwise indexing movement to bring the tube-feeding chucks 30, by pairs, into position for cut off of a pair of lengths of glass tubing, one such pair being designated by the letters $l_1$, $l_2$ in Fig. 1. In this illustrative machine, the cutting turret 12 is designed to handle twenty-four lengths of tubing T. Accordingly, the tube-cutting turret 12 is indexed twelve times during each machine cycle to bring the tube-feeding chucks 30 by pairs into a transfer location A relative to the interposed transfer turret 16, as will be more fully described hereinafter.

As seen best in Figs. 1 and 2, the indexing drive for the cutting turret shaft 32 includes a main motor 34 which has its output shaft 34a coupled by the pulleys 36, 38 and the belt 40 trained thereover to a worm shaft 42 journaled on the machine frame in an appropriate sleeve bearing 44. Fixed to the shaft 42 is a worm 46 which is engaged with a worm wheel or gear 48 which is carried on an indexing shaft 50 journaled on the machine frame 20 (see Fig. 2). Fixed to the indexing shaft 50 is an indexing cam 52 which is in the form of a barrel cam having a peripheral cam track 54 designed to achieve the prescribed stepwise indexing of the tube-cutting turret 12. As is generally understood, the indexing cam 54 is successively engaged by a number of circumferentially spaced cam followers 56 carried on a common follower head 58 secured to the turret shaft 32. In this embodiment, the indexing arrangement is such that the tube-cutting turret 12 will be indexed twelve times during each machine cycle through the required angular traverse to bring successive pairs of tube-feeding chucks 30 into position for transfer of pairs of cut lengths $l_1$, $l_2$ to the transfer turret 16.

The glazing turret 14 is also designed with twenty-four work positions and includes a turret body 60 upon which are rotatably supported a number of glazing spindles 62 which are arranged to receive cut lengths $l$, pair by pair, as will subsequently be described. As seen in Fig. 3, the spindles 60 each include a spindle head 60a having spring biased balls or detents 60b which are arranged to be internally received within and engage the cut lengths of tubing for further processing. The body 60 of the tube-glazing turret 14 is fixed to an upstanding turret shaft 64 which is appropriately journaled within the standard 24.

The tube-glazing turret 14 is indexed stepwise in unison with the tube-cutting turret 12 to bring successive pairs of rotatable spindle 16 in position to receive successive pairs of cut lengths $l_1$, $l_2$ from the transfer turret 16 by gearing the glazing turret shaft 64 to the cutting turret shaft 32. As seen in Fig. 1, this gearing includes a main driving gear 66 fixed to the cutting turret shaft 32, a drive gear 68 fixed to the glazing turret shaft 64 and an intermediate coupling gear 70 in meshing engagement with the gears 66, 68. As will be described hereinafter, the transfer turret 16 is arranged to transfer four pairs of cut lengths during each cycle of its rotation. For this illustrative arrangement, the transfer turret 16 completes three cycles for each cycle of the twenty-four position cutting and glazing turrets 12, 14. Accordingly, the ratio between the gears 66, 70 is established with a three to one step down and the ratio between the gears 70, 68 is established with a three to one step up to attain the desired coordinated indexing of the turrets 12, 14, 16 under control of the indexing drive associated with the cutting turret shaft 32.

Detailed reference will now be made to Figs. 3 to 7, inclusive, for a description of the transfer turret 16 and the coordination of its operation into the tube-cutting and glazing machine 10. The transfer turret 16 includes a substantially circular turret body 72 fixed to a depending turret shaft 74 which is journaled within the standard 26. As seen best in Fig. 5, the upper face 72a of the turret body 72 is provided with four pairs of circumferentially spaced integral bosses, one such pair being designated by the reference numeral 76, 78. The bosses 76, 78 are provided with through vertically-extending bores 80, 82 which open into the undersurface 72b of the turret body 72. Fixed within the through bore 80 is an open-ended tubular guiding sleeve or member 84 and similarly fixed within the through bore 82 is an open-ended tubular guiding sleeve or member 86. In the illustrative machine 10, with the twenty-four position cutting turret 12 and the twenty-four position glazing turret 14, the transfer turret 16 is provided with four pairs of tubular sleeves or guide members 84, 86, which are arranged in succession to receive successive pairs of cut lengths $l_1$, $l_2$, of the glass stock T when brought into the transfer location or position A relative to the tube-cutting turret 12. The angular or circumferential spacing between the tube-receiving sleeves or guides 84, 86 corresponds to the angular spacing between the successive pairs of tube-feeding chucks 30 brought into the transfer location A; that is, the center lines of the sleeves 84, 86 coincide with the center line of successive chucks brought pair by pair into the transfer location or loading position A. Similarly, the angular spacing between the successive pairs of rotary tube-engaging spindles 62 corresponds to the spacing between the successive pairs of guide sleeves 84, 86, such that after indexing the transfer turret 16 in the clockwise direction (see Fig. 5) through the idle location or position C into the delivery location or unloading position C relative to the glazing turret 14, the cut lengths $l_1$, $l_2$ of tubing are disposed with their longitudinal center axes coinciding with the axes of the pair of spindles 60 which are to receive the cut lengths. The drive to the transfer turret 16 is such that during successive indexing of the transfer turret 16 in timed relation to indexing of the cutting and glazing turrets 12, 14, successive pairs of cut lengths $l_1$, $l_2$ are received within the sleeves 84, 86 at the loading or pick-up location A, then moved into the idle location or dwell position B, and then into the delivery location or unloading position C. After unloading, the empty sleeves 84, 86 move into the idle location or dwell position D and then are brought into the loading position A to receive the next pair of cut lengths.

Figures 4, 5:
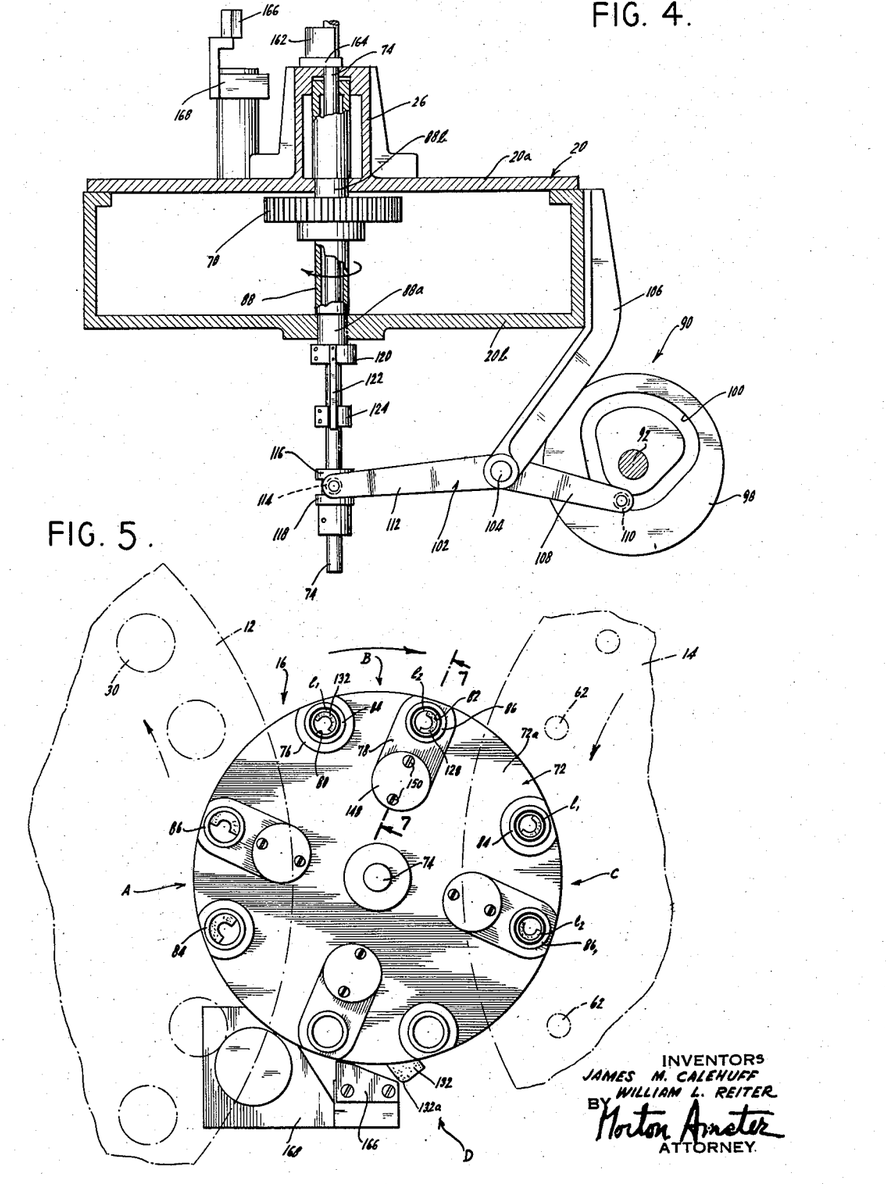
Fig. 4 is a sectional view, on an enlarged scale, taken along the line 4—4 of Fig. 1, looking in the direction of the arrows, showing the details of the turret raising and lowering mechanisms.
Fig. 5 is a top plan view of the transfer turret shown in Fig. 4, with the tube-cutting and tube-glazing turrets indicated by the dot-dash lines.

As seen best in Figs. 3 and 4, the transfer turret 16 is mounted for vertical displacement along the turret axis such that the turret may be moved from the clearance or transfer position (illustrated by the full lines in Fig. 3) into the upwardly displaced tube-receiving and delivering position (illustrated by the broken line in Fig. 3), wherein the pair of guiding sleeves 84, 86 disposed at the loading or pick-up location A encircles the corresponding lengths $l_1$, $l_2$ of glass tubing at the location A for support of such lengths after cutting of the lengths by the rotary cutting wheels 31 which operate in conjunction with the rotary chucks 30 in the known manner. Simultaneous with the loading of a pair of cut lengths into one pair of guiding sleeves 84, 86 at the loading location A, the diametrically opposite pair of guiding sleeves, which have therein cut lengths of tube, move into telescoping relation to the pair of spindles 60 at the unloading location C. The spring biased detents or balls 60b on the glazing heads 60a engage the internal walls of the respective cut lengths for support of the cut lengths such that the transfer turret 16 may be moved through the return or downward stroke in the clearance or transfer position, illustrated by the full lines in Fig. 3. Accordingly, insofar as one pair of guiding sleeves 84, 86 is concerned, the operation is as follows: First, the guiding sleeves are indexed into the loading location A whereupon, during the dwell or stationary period of the transfer turret 16, the guiding sleeves are displaced vertically into the broken line position to receive a pair of lengths of tubing. Thereupon, during the same dwell or stationary period of the transfer turret, the guide sleeves return to the clearance or transfer position, whereupon the pair of guide sleeves containing the cut lengths of tubing are moved into the idle or dwell position B. The transfer turret moves upwardly and returns with the cut lengths at the idle position B.

In the next indexing interval, the pair of cut lengths in the guiding sleeves are brought into the unloading or delivering position C. When the transfer turret is again displaced through its vertical stroke, the pair of cut lengths are delivered into telescoping relation to the spindles 16 of the glazing turret 14. It will, of course, be appreciated that during each interval of the machine operation, a pair of cut lengths are being delivered to a pair of guiding sleeves at location A, while a further pair of cut lengths are being delivered to the spindles at location C.

As seen best in Fig. 4, the transfer turret 16 is mounted for vertical displacement along the turret axis defined by the shaft 74 by slidably supporting the shaft 74 in a telescoped hollow cylindrical drive shaft 88 which includes bearing portions 88a, 88b journaled in the lower and upper wall 20a, 20b of the housing 20. The turret shaft 74 is periodically moved upwardly to elevate the transfer turret 16 through the prescribed vertical stroke or thrust for bringing the respective pairs of guiding sleeves 84, 86 into position for loading and unloading of cut lengths of tubing by a raising and lowering mechanism, generally designated by the reference numeral 90, which is coordinated into the overall machine operation. As seen best in Figs. 1 and 2, the mechanism 90 includes a cam shaft 92 arranged to extend from side to side of the machine and at right angles to the indexing shaft 50 which extends fore and aft of the machine. The cam shaft 92 is journaled on the machine frame and is coupled to and driven by the index shaft 50 via the bevel gearing 94, 96. The cam shaft 92 carries a number of control cams for achieving the various related operations of the mechanisms associated with the cutting turret 12 and the glazing turret 14. However, since these details are not necessary for an understanding of the present invention, their illustration and description has been dispensed with in the interest of simplicity and clarity. It suffices to point out that the cam shaft 92 carries a face cam 98 formed with a cam track 100 having a development selected to raise the transfer turret 16 through the prescribed vertical thrust and to return the transfer turret to its clearance position between successive indexings of the transfer turret 16 in unison with indexing of the turrets 12, 14. The turret raising and lowering cam 98 is coupled to the turret shaft 74 by a bell crank follower 102 which is pivoted by an axle 104 on a supporting bracket 106 suspended from and fixed to the machine frame 20. The bell crank follower 102 includes a follower arm 108 extending in one direction from the axle 104 which carries a follower roller 110 engaged within the cam track 100 and further includes a bifurcated coupling yoke 112 extending in the opposite direction from the axle 104 and carrying rollers 114 engaged between fixed stop collars 116, 118 on the turret shaft 74. Accordingly, in response to clockwise rotation of the bell crank 102 about its pivot 104 (see Fig. 4), the transfer turret 16 is raised and in response to counterclockwise rotation of the bell crank 102, the turret shaft 74 is lowered. The position of the cam 98 with its dwell portion opposite the follower roller 110 corresponds to the lower or clearance position for the transfer turret 16 which is illustrated in Fig. 3.

The gear 70 of the indexing gear train 66, 68, 70 is fixed to the rotatable shaft or sleeve 88 which in turn has a slidable coupling to the turret shaft 74 for indexing of the transfer turret shaft 74 without interfering with the raising and lowering of the transfer turret under control of the cam-controlled raising and lowering mechanisms 90. As seen in Fig. 4, the slidable coupling includes a coupling head or collar 120 fixed to the shaft 88 and carrying a coupling finger 122 extending longitudinally of the turret shaft 74 and slidably engaged within a further coupling head or collar 124 fixed to the turret shaft 74. The spline connection provided by the elements 120, 122, 124 enables the displacement of the turret shaft 74, yet provides an effective driving connection to the turret shaft from the gear 70.

Figure 6:
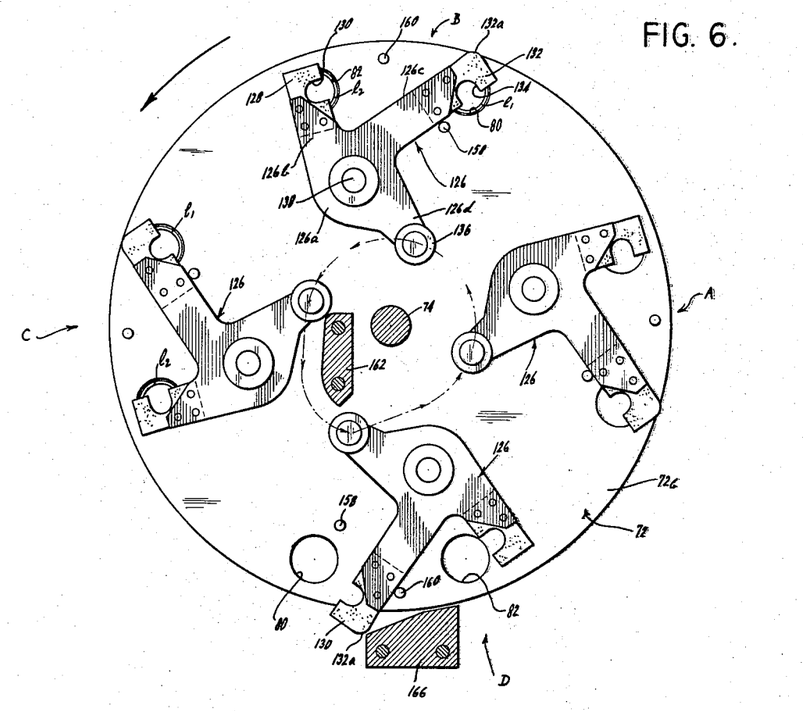
Fig. 6 is the bottom plan view of the turret shown in Fig. 5, taken on an enlarged scale and showing the details of the cam-actuated closures or abutments movably supported on the transfer turret.
Figure 7:
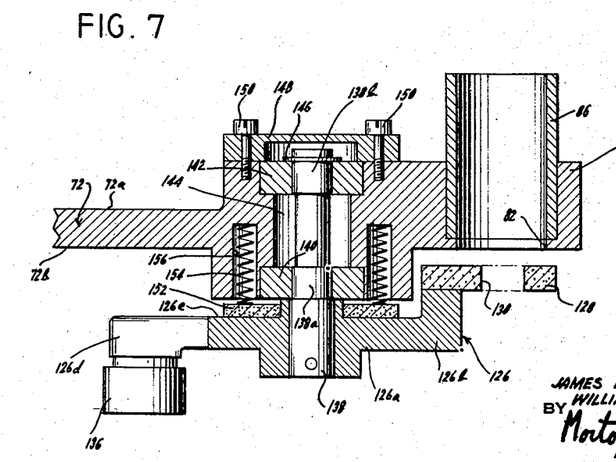
Fig. 7 is a sectional view, on an enlarged scale, taken along the line 7—7 of Fig. 5 showing the details of the mechanisms for movably mounting the closures or abutments on the transfer turret.

Disposed in operative relation to each pair of guiding sleeves 84, 86 on the transfer turret 16 is a closure, abutment or escapement member 126 which at least partially closes the lower ends of the tube-guiding sleeves 84, 86 and serves as a footing for the pair of cut lengths $l_1$, $l_2$ during transfer from the loading location A to the unloading location C. Since each of the closure or abutment members 126 is of identical construction, it will suffice to describe only one in detail. Referring specifically to Figs. 5 to 7, inclusive, the closure or abutment member 126 at the idle location or position B is seen to include a main body portion or section 126a, a first arm 126b which is arranged to normally extend toward the through bore 80 and its guide sleeve 84, a second arm 126c which is arranged to extend toward the through bore 82 and its guide sleeve 86, and a third arm 126d which is arranged to extend toward the turret shaft or axle 74. The arm 126b carries a footing plate 128 which may be fabricated of a yieldable plastic serving to cushion the slight impact occasioned by dropping of the cut length of glass thereagainst. The footing plate 128 is provided with an elongated, transversely-extending semi-circular cutout 130 extending inwardly from one side thereof such that a major portion of the open end of the guide sleeve 84 remains unconstricted, with the footing plate providing a support about the inner periphery of the guide sleeve 84. Accordingly, although a support is provided for the cut length received within the guide sleeve 84, a major portion of the guide sleeve remains unobstructed. Similarly, the arm 126c carries a footing plate 132 provided with a transversely-extending, semi-circular cutout 134 disposed beneath the through bore 82 and its guide sleeve 86. The arm 126d carries a roller 136. As seen in Fig. 7 the closure or abutment member 126 is mounted for rocking movement on the transfer turret body 72 by a vertically-extending stub shaft or axle 138 which is fixed to the body portion 126a of the member 126. The stub shaft 138 includes bearing sections 138a, 138b journaled in respective bearings 140, 142 fixed within a bore 144 formed within the integral boss 78 on the transfer turret body 72. The stub shaft is held in position by a snap ring 146 which is received in an appropriate peripheral notch within the stub shaft 138 and lies against the bearing 142. The upper end of the bore 144, containing the stub shaft and its supporting bearings 140, 142, is closed by a removable cap 148 fixed in position by appropriate machine screws 150. The stub shaft 138 journals the closure or abutment member 126 for rocking movement about a vertical axis from the operative or supporting position, as shown at the locations A, B and C in Fig. 6, to a clearance or non-supporting position, as shown at location D in Fig. 6 wherein the respective footings 128, 132 are offset from beneath the through bores 80, 82 associated with the guide sleeves 84, 86 whereby accumulations of glass particles, fragments, etc., may be purged from the guide sleeves by the action of gravity. Between the locations C and D and beneath the course followed by the through bores 80, 82 when indexed into the idle location D, there is provided an appropriate escapement chute (not shown) which receives such glass accumulations and fragments and directs the same to an appropriate receptacle.

The closure or escapement member 126 is constrained against rocking movement unless positively actuated by the provision of a friction disc 152 which bears against the upper surface 126e of the body portion 126a and encircles the stub shaft 138. The friction disc 152, which is fabricated of an appropriate compressed fiber or the like, is spring-loaded against the surface 126e by springs 154 compressed within accommodating bores 156 formed in the undersurface of the turret body at appropriate spaced locations about the stub shaft 138.

In order to limit the extent of rocking movement of each closure or escapement member 126 about the pivotal axis provided by its stub shaft 138, there is fixed to the undersurface of the turret body 72 a pair of stop pins 158, 160 (see Fig. 6). The stop pin 158 associated with each closure member 126 establishes the limit position occupied by the closure member between the loading location A and the unloading location C, while the stop pin 160 establishes the limit position for the closure member 126 intermediate the locations C and D wherein glass particles and the like are discharged through the unrestricted open ends of the through bores 80, 82.

The closure or escapement member 126 is rocked from its operative position providing footings for the respective cut lengths of glass tubes in the guide sleeves 84, 86 to the clearance position after unloading of said pair of cut lengths at the unloading location C by a stationary closure or escapement actuating cam 162 (see Fig. 6). The actuating cam 162 is supported beneath the transfer turret body 72 in position to engage the roller 136 on the arm 126d. As illustrated diagrammatically by the directional arrows and the dot-dash lines, the roller 136 follows a substantially circular course until engaged with the cam 162 at the unloading location C. During the indexing interval which advances the closure member 126 from the unloading location C to the idle location D, the cam development 162 is such as to pivot the closure member about its pivotal axis 138 in the counterclockwise direction (as viewed in Fig. 6) to move the respective footings 128, 132 to the clearance position as established by the stop pin 160. As seen best in Figs. 3 and 4, the closure or escapement actuating cam 162 is fixed to a stationary supporting bracket 164 mounted on the machine frame 20.

In order to restore the closure or escapement member 126 to its normal or operative position in which it provides a footing or partial closure at the lowermost end of the tube-receiving guides or sleeves 84, 86, a further actuating cam 166 is provided at the idle location or position D. The actuating cam 166 is arranged and has a development such as to engage the outer curved surface 132a of the footing plate 132 during the indexing of the closure member 126 from the idle location D into the loading location A and to pivot the closure member 126 in the clockwise direction to restore the same to its normal or operative position against the limiting stop or pin 158. As seen best in Figs. 3 and 4, the closure or escapement actuating cam 166 is mounted outwardly of the periphery of the transfer turret on an appropriate supporting bracket 168 fixed to the machine frame 20.

Reference will now be made to a typical sequence of operations to facilitate a more thorough understanding of the present invention:

At the start of a transfer cycle, a pair of lengths $l_1$, $l_2$ of tubing T depend below the respective supporting chucks 30 on the cutting turret 12 with their axes in alignment with the pair of tubular guides or sleeves 84, 86 disposed at the first transfer or loading location A. Thereupon the transfer turret raising and lowering mechanisms 90 are effective to elevate the transfer turret 16 through a prescribed thrust from the transfer position, illustrated by the full lines in Fig. 3, to the tube-receiving and delivering position illustrated by the dot-dash lines in said figure. As the transfer turret 16 moves upwardly the tubular guides 84, 86 encircle the depending lengths of the glass tubing. After the transfer turret 16 has arrived at the elevated tube-receiving position, the rotary cutting knives 31 which coact with the chucks 30 in a known manner, are effective to cut off the prescribed lengths $l_1$, $l_2$ whereupon the cut lengths drop through a short fall and are supported within the tubular guides 84, 86 on the respective footing plates 128, 132. After the loading of the pair of tubular guides 84, 86, the raising and lowering mechanisms 90 restore the transfer turret 16 to the full line position illustrated in Fig. 3. Thereupon the coordinated indexing drive for the turrets 12, 14, 16 is effective to index the turrets in unison, with the cutting turret 12 turning in the counterclockwise direction, with the transfer turret turning in the clockwise direction, and with the glazing turret 14 turning in the counterclockwise direction (when viewed from above as indicated by the directional arrows in Fig. 5). This brings the loaded tubular guides 84, 86 into the idle or dwell location B wherein the transfer turret 16 is again raised and lowered. Upon the next indexing of the transfer turret 16, the loaded tubular guides 84, 86 move into the unloading location C wherein the cut lengths $l_1$, $l_2$ are beneath and in axial alignment with a pair of glazing spindles 60 which are adapted to internally engage and support the respective cut lengths. When the transfer turret 16 is again raised to the tube-receiving and delivering position, illustrated by the broken lines in Fig. 3, the pair of cut lengths are moved vertically into telescoping relation with the pair of rotary spindles 60; and as the transfer turret 16 moves downwardly to the clearance position, the cut lengths are left supported on the respective rotary spindles 60. As the transfer turret is again indexed, the roller 136 engages the cam 162 (see Fig. 6) which is effective to turn the closure or escapement member 126 into a clearance position relative to the through bores 80, 82 of the tubular guides 84, 86 such that any glass particles, fragments, etc. fall into the escapement chute which is disposed beneath the turret at this location. After clearing of the tubular guides during movement between the loading location C and the idle location D, the camming surface 132a is brought into position against the stationary actuating cam 166. After the transfer turret 16 is again raised and lowered, the turret is again indexed and during this indexing interval the closure or escapement member 126 is restored to the operative position partially bridging or closing the lower ends of the associated tubular guides. In connection with the actuation of the closure member 126, it is noted that the actuating cams 162, 166 are of sufficient vertical extent to maintain their respective followers 136, 132a oriented relative to the camming surfaces during the raising and lowering of the transfer turret 16 at the several index locations.

Although the above sequence of operations has been described as if only one pair of cut lengths were progressing through the machine at any one time, it will of course be appreciated that the operations at the several locations occur simultaneously, with loading occurring at location A, unloading occurring at location C, actuating of the closure or escapement mechanism between the locations C and D, and restoration of the closure or escapement mechanisms between the locations D and A.

A latitude of modification, change and substitution is intended in the foregoing disclosure and in some instances some features of the invention will be used without a corresponding use of other features. Accordingly, it is appropriate that the claims be construed broadly and in a manner consistent with the spirit and scope of the disclosure herein.

What we claim is:

1. In a tube-cutting and glazing machine including a cutting turret and a glazing turret, a transfer turret arranged intermediate said cutting turret and said glazing turret and arranged to transfer cut lengths of tube from said cutting turret to said glazing turret, means operatively connected to and mounting said transfer turret for indexing movement and for displacement from a clearance position spaced from said cutting and glazing turrets to a transfer position displaced toward said cutting and glazing turrets, a tube-receiving sleeve on said transfer turret arranged to receive a cut length of tube from said cutting turret when said transfer turret is in said transfer position with said tube-receiving sleeve in pick-up relation to said cutting turret and to deliver said cut length to said glazing turret when said transfer turret is in said transfer position with said tube-receiving sleeve in drop-off relation to said glazing turret, means operatively connected to said transfer turret for indexing said transfer turret, means operatively connected to said transfer turret and operable in timed relation to the indexing means for displacing said transfer turret from said clearance position into said transfer position, a footing for said tube-receiving sleeve disposed in cooperating relation therewith to provide a support for said cut length, and means operative to periodically move said footing out of cooperating relation with said tube-receiving sleeve such that tube-receiving sleeve may be periodically cleared of tube fragments.

2. A tube-transfer unit for use in a tube-cutting and glazing machine including a cutting turret and a glazing turret, said unit comprising a transfer turret arranged intermediate said cutting turret and said glazing turret and arranged to transfer cut lengths of tube from said cutting turret to said glazing turret, means operatively connected to and mounting said transfer turret for indexing movement about a turret axis and for displacement along said turret axis from a clearance position spaced from said cutting and glazing turrets to a tube-receiving and delivering position displaced toward said cutting and glazing turrets, an open-ended tube-receiving member on said transfer turret arranged to receive a cut length of tube from said cutting turret when said transfer turret is in said tube-receiving position with said tube-receiving member in transfer relation to said cutting turret and to deliver said cut length to said glazing turret when said tube-receiving member is in transfer relation to said glazing turret, means operatively connected to said transfer turret for indexing said transfer turret, means operatively connected to said transfer turret and operable in timed relation to the indexing means for displacing said transfer turret from said clearance position into said tube-receiving and delivering position, closure means for said tube-receiving member disposed to at least partially close one end thereof to provide a support for said cut length, and means operative to periodically move said closure means out of closing relation to said one end of said tube-receiving member such that said tube-receiving member may be periodically cleared of tube fragments.

3. In a tube-cutting and glazing machine including a cutting turret and a glazing turret, a transfer turret arranged intermediate said cutting turret and said glazing turret and arranged to transfer cut lengths of tube from said cutting turret to said glazing turret, means operatively connected to and mounting said transfer turret for indexing movement about a turret axis and for displacement along said turret axis from a clearance position spaced from said cutting and glazing turrets to a tube-receiving and delivering position displaced toward said cutting and glazing turrets, tube-receiving means on said transfer turret arranged to receive a cut length of tube from said cutting turret when said transfer turret is in said tube-receiving and delivering position with said tube-receiving means in transfer relation to said cutting turret and to deliver said cut length to said glazing turret when said transfer turret is in said tube-receiving and delivering position with said tube-receiving means in transfer relation to said glazing turret, means operatively connected to said transfer turret for indexing said transfer turret, means operatively connected to said transfer turret and operable in timed relation to the indexing means for displacing said transfer turret from said clearance position into said tube-receiving and delivering position between indexing intervals, closure means for said tube-receiving means disposed in cooperating relation therewith to provide a support for said cut length, and means operative to periodically move said closure means out of cooperating relation with said tube-receiving means such that tube-receiving means may be periodically cleared.

4. A tube-transfer device for use in a tube-cutting and glazing machine including cutting and glazing turrets, said device comprising a tube-transfer turret disposed intermediate said cutting and glazing turrets and arranged to transfer successive cut lengths of tube from said cutting turret to said glazing turret, an open ended tube-guiding sleeve on said transfer turret arranged to receive said cut length from said cutting turret at a first transfer location and to deliver said cut length to said glazing turret at a second transfer location, means operatively connected to and mounting said turret for indexing movement and for displacement from a transfer position into a tube-receiving and delivery position whereby said tube-guiding sleeve may be moved toward said cutting turret when at said first transfer location to receive a cut length from said cutting turret, returned to said transfer position for indexing of said transfer turret, and thereafter moved toward said glazing turret when at said second transfer location to deliver said cut length to said glazing turret, means operatively connected to said transfer turret for indexing said transfer turret to advance said tube-guiding sleeve from said first transfer location into said second transfer location, means operable in timed relation to the indexing means for moving said transfer turret from said transfer position into said tube-receiving and delivery position and for returning said transfer turret to said transfer position during the interval between indexing of said transfer turret, an abutment disposed in an operative position to said tube-guiding sleeve to at least partially close the lower end of said tube-guiding sleeve and serving as a footing for said cut length, means mounting said abutment for movement into a clearance position relative to tube-guiding sleeve for clearing the sleeve of tube fragments, and means for moving said abutment into said clearance position after indexing of said tube-guiding sleeve into said second transfer location and for returning said abutment to said operative position prior to indexing of said tube-guiding sleeve into said first transfer location.

5. In combination with a tube-cutting turret and a tube-glazing turret, a tube-transfer turret disposed intermediate and below said tube-cutting turret and said tube-glazing turret and arranged to transfer successive cut lengths of tube from said tube-cutting turret to said tube-glazing turret, at least one upstanding open ended tube-guiding sleeve on said tube-transfer turret arranged to receive said cut length from said tube-cutting turret at a first transfer location and to deliver said cut length to said tube-glazing turret at a second transfer location, means operatively connected to and mounting said turret for indexing movement about a vertical axis and for displacement along said vertical axis from a transfer position into an upwardly displaced tube-receiving and delivering position whereby said tube-guiding sleeve may be moved upwardly when at said first transfer location to receive a cut length from said tube-cutting turret, returned to said transfer position for indexing of said transfer turret, and thereafter moved upwardly when at said second transfer location to deliver said cut length to said tube-glazing turret, means operatively connected to said tube-transfer turret for indexing said tube-transfer turret to advance said tube-guiding sleeve from said first transfer location into said second transfer location, means operable in timed relation to the indexing means for moving said tube-transfer turret from said transfer position into said tube-receiving and delivering position and for returning said tube-transfer turret to said transfer position during the interval between indexing of said transfer turret, an abutment disposed in an operative position to at least partially close the lower end of said tube-guiding sleeve and serving as a footing for said cut length, means mounting said abutment for movement into a clearance position relative to said tube-guiding sleeve for clearing the sleeve of tube fragments, and means for moving said abutment into said clearance position after indexing of said tube-guiding sleeve into said second transfer location and for returning said abutment to said operative position prior to indexing of said tube-guiding sleeve into said first transfer location.

6. In combination with a tube-cutting turret and a tube-glazing turret, a tube-transfer turret disposed intermediate and below said tube-cutting turret and said tube-glazing turret and arranged to transfer successive pairs of cut lengths of tube from said tube-cutting turret to said tube-glazing turret, at least one pair of upstanding open ended tube-guiding sleeves on said tube-transfer turret arranged to receive said pair of cut lengths from said tube-cutting turret at a first transfer location and to deliver said pair of cut lengths to said tube-glazing turret at a second transfer location, means operatively connected to and mounting said turret for indexing movement about a vertical axis and for displacement along said vertical axis from a transfer position into an upwardly displaced tube-receiving and delivering position whereby said pair of tube-guiding sleeves may be moved upwardly when at said first transfer location to receive a pair of cut lengths from said tube-cutting turret, returned to said transfer position for indexing of said transfer turret, and thereafter moved upwardly when at said second transfer location to deliver said pair of cut lengths to said tube-glazing turret, means operatively connected to said tube-transfer turret for indexing said tube-transfer turret to advance said pair of tube-guiding sleeves from said first transfer location into said second transfer location, means operable in timed relation to the indexing means for moving said tube-transfer turret from said transfer position into said tube-receiving and delivering position and for returning said tube-transfer turret to said transfer position during the interval between indexing of said transfer turret, abutments disposed in an operative position to at least partially close the lower ends of said pair of tube-guiding sleeves and serving as footings for said pair of cut lengths, means mounting said abutments for movement into a clearance position relative to said pair of tube-guiding sleeves for clearing the respective guide sleeves of tube fragments, and means for moving said abutments into said clearance position after indexing of said pair of tube-guiding sleeves into said second transfer location and for returning said abutments to said operative position prior to indexing of said pair of tube-guiding sleeves into said first transfer location.

7. In a tube-cutting and glazing machine including a cutting turret having at least one tube-feeding chuck and a glazing turret having at least one tube-supporting spindle, a transfer turret arranged intermediate said cutting turret and said glazing turret and arranged to transfer cut lengths of tube from said cutting turret to said glazing turret, means operatively connected to and mounting said transfer turret for indexing movement about a turret axis and for displacement along said turret axis from a clearance position spaced below said cutting and glazing turrets to a tube-receiving and delivering position displaced toward said cutting and glazing turrets, a tube-receiving sleeve on said transfer turret arranged to receive a cut length of tube from said cutting turret when said transfer turret is in said tube-receiving and delivering position with said tube-receiving sleeve in alignment with said chuck and to deliver said cut length to said glazing turret when said transfer turret is in said tube-receiving and delivering position with said tube-receiving sleeve in alignment with said spindle of said glazing turret, means operatively connected to said transfer turret for indexing said transfer turret stepwise to advance said tube-receiving sleeve through a transfer cycle, means operatively connected to said transfer turret and operable in timed relation to the indexing means for displacing said transfer turret from said clearance position into said tube-receiving and delivering position to position said tube-receiving sleeve for pick-up of a cut length of tube from said chuck and for delivery of said cut length to said spindle, closure means for said tube-receiving sleeve disposed in cooperating relation therewith to provide a support for said cut length, and means operative to move said closure means out of cooperating relation with said tube-receiving sleeve after delivery of a cut length to said spindle and prior to pick-up of the next cut length from said chuck such that tube-receiving sleeve may be cleared during each transfer cycle.

8. A transfer device for use in a tube-cutting and glazing machine including a cutting turret having at least one tube-feeding chuck and a glazing turret having at least one tube-supporting spindle, said transfer device comprising a transfer turret adapted to be arranged intermediate said cutting turret and said glazing turret and arranged to transfer cut lengths of tube from said cutting turret to said glazing turret, means operatively connected to and mounting said transfer turret for indexing movement about a turret axis and for displacement along said turret axis from a clearance position spaced below said cutting and glazing turrets to a tube-receiving and delivering position displaced toward said cutting and glazing turrets, a tube-receiving sleeve on said transfer turret arranged to receive a cut length of tube from said cutting turret when said transfer turret is in said tube-receiving and delivering position with said tube-receiving sleeve in alignment with said chuck and to deliver said cut length to said glazing turret when said transfer turret is in said tube-receiving and delivering position with said tube-receiving sleeve in alignment with said spindle of said glazing turret, means operatively connected to said transfer turret for indexing said transfer turret stepwise to advance said tube-receiving sleeve through a transfer cycle, means operatively connected to said transfer turret and operable in timed relation to the indexing means for displacing said transfer turret from said clearance position into said tube-receiving and delivering position to position said tube-receiving sleeve for pick-up of a cut length of tube from said chuck and for delivery of said cut length to said spindle, closure means for said tube-receiving sleeve disposed in cooperating relation therewith to provide a support for said cut length, and means operative to move said closure means out of cooperating relation with said tube-receiving sleeve after delivery of a cut length to said spindle and prior to pick-up of the next cut length from said chuck such that tube-receiving sleeve may be cleared during each transfer cycle.

9. In a tube-cutting and glazing machine including a cutting turret and a glazing turret, a transfer mechanism arranged intermediate said cutting turret and said glazing turret and arranged to transfer cut lengths of tube from said cutting turret to said glazing turret, means operatively connected to and mounting said transfer mechanism for indexing movement and for displacement from a clearance position spaced from said cutting and glazing turrets to a tube-receiving and delivering position displaced toward said cutting and glazing turrets, tube-receiving means on said transfer mechanism arranged to receive a cut length of tube from said cutting turret when in transfer relation to said cutting turret and to deliver said cut length to said glazing turret when in transfer relation to said glazing turret, means operatively connected to said transfer mechanism for indexing said transfer mechanism, means operatively connected to said transfer mechanism and operable in timed relation to the indexing means for displacing said transfer mechanism from said clearance position into said tube-receiving and delivering position, closure means for said tube-receiving means disposed in cooperating relation therewith to provide a support for said cut length, and means operative to periodically move said closure means out of cooperating relation with said tube-receiving means such that tube-receiving means may be periodically cleared.

10. In combination with a tube-cutting turret and a tube-glazing turret, a tube-transfer turret disposed intermediate said tube-cutting turret and said tube-glazing turret and arranged to transfer successive pairs of cut lengths of tube from said tube-cutting turret to said tube-glazing turret, at least one pair of upstanding open ended tube-guiding sleeves on said tube-transfer turret arranged to receive said pair of cut lengths from said tube-cutting turret at a first transfer location and to deliver said pair of cut lengths to said tube-glazing turret at a second transfer location, means operatively connected to and mounting said turret for indexing movement for displacement from a transfer position into an upwardly displaced tube-receiving and delivery position whereby said pair of tube-guiding sleeves may be moved toward said tube-cutting turret when at said first transfer location to receive a pair of cut lengths from said tube-cutting turret, returned to said transfer position for indexing of said transfer turret, and thereafter moved toward said tube-glazing turret when at said second transfer location to deliver said pair of cut lengths to said tube-glazing turret, means operatively connected to said tube-transfer turret for indexing said tube-transfer turret to advance said pair of tube-guiding sleeves from said first transfer location into said second transfer location, means operable in timed relation to the indexing means for moving said tube-transfer turret from said transfer position into said tube-receiving and delivery position and for returning said tube-transfer turret to said transfer position during the interval between indexing of said tube-transfer turret, closure means disposed in an operative position to said pair of tube-guiding sleeves and arranged to at least partially close the lower ends of said pair of tube-guiding sleeves and serving as footings for said pair of cut lengths, means mounting said closure means for movement into a clearance position relative to said pair of tube-guiding sleeves for clearing the respective tube-guiding sleeves of tube fragments, and means for moving said closure means into said clearance position after indexing of said pair of tube-guiding sleeves into said second transfer location and for returning said closure means to said operative position prior to indexing of said pair of tube-guiding sleeves into said first transfer location.

11. In a machine for cutting and glazing lengths of glass tubing of the type including a tube-cutting unit including an intermittently indexed cutting turret and tube-feeding and cutting mechanisms on said cutting turret for feeding a prescribed length of tubing into position for cut-off and transfer and a tube-glazing unit including an intermittently indexed glazing turret and rotatable glazing spindles on said glazing turret arranged to internally engage and support cut lengths of tubing, the improvement comprising a transfer unit interposed between said tube-cutting and tube-glazing units and arranged to receive successive cut lengths of tubing and transfer same into supporting relation on said spindles, said transfer unit including an intermittently indexed transfer turret and tube-receiving members on said transfer turret each having an open bottom, drive means operatively connected to said cutting, glazing and transfer turrets for indexing said turrets in timed relation to each other, closures at least partially blocking the open bottoms of said tube-receiving members and providing footings for the cut lengths of tubing received therein, and means operable in timed relation to indexing of said turrets to move said closures out of blocking relation to said tube-receiving members to clear same of glass fragments and particles.

12. In a machine for cutting and glazing lengths of glass tubing, a tube-cutting unit including an intermittently indexed cutting turret and tube-feeding and cutting mechanisms on said cutting turret for feeding a prescribed length of tubing into position for cut-off and transfer, a tube-glazing unit including an intermittently indexed glazing turret and rotatable glazing spindles on said glazing turret arranged to internally engage and support cut lengths of tubing, a transfer unit interposed between said tube-cutting and tube-glazing units and arranged to receive successive cut lengths of tubing and transfer same into supporting relation on said spindles, said transfer unit including an intermittently indexed transfer turret and tube-receiving members on said transfer turret each having an open bottom, drive means operatively connected to said cutting, glazing and transfer turrets for indexing said turrets in timed relation to each other, closures at least partially blocking the open bottoms of said tube-receiving members and providing footings for the cut lengths of tubing received therein, and means operable in timed relation to indexing of said turrets to move said closures out of blocking relation to said tube-receiving members to clear same of glass fragments and particles.

13. In a machine for cutting and glazing lengths of glass tubing, a tube-cutting unit including a cutting turret and tube-feeding and cutting mechanisms on said cutting turret for feeding a prescribed length of tubing into position for cut-off and transfer, a tube-glazing unit including a glazing turret and rotatable glazing spindles on said glazing turret arranged to engage and support cut lengths of tubing, a transfer unit interposed between said tube-cutting and tube-glazing units and arranged to receive successive cut lengths of tubing and transfer same into supporting relation on said spindles, said transfer unit including a transfer turret and tube-receiving members on said transfer turret each having an open bottom, drive means operatively connected to said cutting, glazing and transfer turrets for moving said turrets in timed relation to each other, closures movably mounted on said transfer turret and arranged to at least partially block the open bottoms of said tube-receiving members and provide footings for the cut lengths of tubing received therein, and means operable in timed relation to movement of said turrets to move said closures out of blocking relation to said tube-receiving members to clear same of glass fragments and particles.

References Cited in the file of this patent

UNITED STATES PATENTS

| | | |
|---|---|---|
| 1,046,723 | Beadle | Dec. 10, 1912 |
| 1,546,353 | Rippl et al. | July 14, 1925 |
| 2,004,492 | McNamara et al. | June 11, 1935 |
| 2,447,568 | Eisler | Aug. 24, 1948 |